United States Patent
Takada et al.

(10) Patent No.: US 9,927,238 B2
(45) Date of Patent: Mar. 27, 2018

(54) PHYSICAL QUANTITY SENSOR, ELECTRONIC APPARATUS, AND MOVING OBJECT

(71) Applicant: Seiko Epson Corporation, Tokyo (JP)

(72) Inventors: Yutaka Takada, Minamiminowa-mura (JP); Kenji Sato, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 192 days.

(21) Appl. No.: 15/051,224

(22) Filed: Feb. 23, 2016

(65) Prior Publication Data

US 2016/0265915 A1 Sep. 15, 2016

(30) Foreign Application Priority Data

Mar. 9, 2015 (JP) .................. 2015-045574

(51) Int. Cl.
*G01C 19/5607* (2012.01)
*G01C 19/5614* (2012.01)
*G01C 19/5776* (2012.01)

(52) U.S. Cl.
CPC ..... *G01C 19/5607* (2013.01); *G01C 19/5614* (2013.01); *G01C 19/5776* (2013.01)

(58) Field of Classification Search
CPC ............ G01C 19/5607; G01C 19/5614; G01C 19/5776

USPC .............. 73/504.01, 504.02, 504.14, 504.15, 73/504.16
See application file for complete search history.

(56) References Cited

U.S. PATENT DOCUMENTS 5,880,827 A * 3/1999 Heinke .................. G01R 15/09
  323/226
7,127,945 B2  10/2006 Ookoshi
7,779,687 B2 * 8/2010 Murashima ........ G01C 19/5607
  73/504.12

FOREIGN PATENT DOCUMENTS

| JP | 2000209053 A | * | 7/2000 |
| JP | 2005-257615 A | | 9/2005 |
| JP | 2008-070132 A | | 3/2008 |
| JP | 2014-149229 A | | 8/2014 |

OTHER PUBLICATIONS

English translation of JP 2000209053 A.*

* cited by examiner

*Primary Examiner* — Peter Macchiarolo
*Assistant Examiner* — Irving A Campbell
(74) *Attorney, Agent, or Firm* — Oliff PLC (57) ABSTRACT

Dynamic range of a second amplifier which is provided in a subsequent stage of a synchronous detection circuit is set greater than dynamic range of a first amplifier which is provided in a preceding stage of the synchronous detection circuit, and thus, an output is prevented from being saturated.

15 Claims, 11 Drawing Sheets

PHYSICAL QUANTITY SENSOR, ELECTRONIC APPARATUS, AND MOVING OBJECT

BACKGROUND

1. Technical Field

The present invention relates to a physical quantity sensor, an electronic apparatus, and a moving object.

2. Related Art

An angular rate sensor which includes a detection circuit is known in the related art, for example, as described in JP-A-2014-149229. The detection circuit includes a differential amplifier circuit (referred to as a differential amplifier in JP-A-2014-149229), and a synchronous detection circuit (referred to as a synchronization detector in JP-A-2014-149229) which performs synchronous detection of a signal that is output from a differential amplifier.

In the detection circuit described in JP-A-2014-149229, an amplification rate of a differential amplifier circuit is set variably, and if an excessive impact is applied, the amplification rate decreases. Accordingly, an output of the differential amplifier circuit is prevented from being saturated. In addition, a synchronous detection circuit also includes an operational amplifier, and when the amplification rate of the differential amplifier circuit decreases, an amplification rate of the synchronous detection circuit increases. Accordingly, a multiplication value of the amplification rate of the differential amplifier circuit and the amplification rate of the synchronous detection circuit becomes constant.

However, in an angular rate sensor described in JP-A-2014-149229, if the amplification rate of the differential amplifier decreases, the amplification rate of the synchronization detector increases, and thus, if an excessive impact is applied, the amplification rate of the synchronization detector can be greater than that of the differential amplifier. In general, saturation voltages of the circuits are the same as each other, and thus, there is a possibility that an output of an operational amplifier included in the synchronization detector or an output of an amplifier provided in a subsequent stage thereof is saturated.

As a result, there is a problem that a correct signal is not output from an amplifier provided in a subsequent stage, and thus, a sensor can output incorrect angular rate.

SUMMARY

An advantage of some aspects of the invention is to solve at least a part of the problems described above, and the invention can be implemented as the following forms or application examples.

Application Example 1

A physical quantity sensor according to this application example includes: a physical quantity detection element which outputs a physical quantity signal in accordance with physical quantity that is applied; and a physical quantity detection circuit which processes the physical quantity signal, in which the physical quantity detection circuit includes a first amplifier circuit, a synchronous detection circuit which receives a signal from the first amplifier circuit, and a second amplifier circuit which receives a signal from the synchronous detection circuit, and in which dynamic range of the second amplifier circuit is greater than dynamic range of the first amplifier circuit.

According to this application example, the dynamic range of the second amplifier circuit is greater than the dynamic range of the first amplifier circuit, and thus, even if excessive physical quantity is applied, an output of the second amplifier circuit is not saturated. Hence, it is possible to provide a physical quantity sensor which reduces the possibility that output is incorrect.

Application Example 2

A physical quantity sensor according to this application example includes: a physical quantity detection element which outputs a physical quantity signal in accordance with physical quantity that is applied; and a physical quantity detection circuit which processes the physical quantity signal, in which the physical quantity detection circuit includes a first amplifier circuit, a synchronous detection circuit which receives a signal from the first amplifier circuit, and a second amplifier circuit which receives a signal from the synchronous detection circuit, and in which a ratio $V1/A1$ between a saturation voltage $V1$ of the first amplifier circuit and an amplification rate $A1$ of the first amplifier circuit, and a ratio $V2/A2$ between a saturation voltage $V2$ of the second amplifier circuit and an amplification rate $A2$ of the second amplifier circuit, satisfy a relationship of $V2/A2 > V1/A1$.

According to this application example, $V1/A1$ and $V2/A2$ satisfy the above-described relationship, and thus, a minimum value of an input voltage in which the second amplifier circuit is saturated is larger than a minimum value of an input voltage in which the first amplifier circuit is saturated. Hence, the second amplifier circuit is harder to be saturated than the first amplifier circuit, and thus, it is possible to provide a physical quantity sensor which reduces the possibility that output is incorrect.

Application Example 3

In the physical quantity sensor according to the application example, it is preferable that the physical quantity is angular rate, and the dynamic range of the first amplifier circuit is greater than or equal to 300°/s.

According to this application example, the dynamic range of the first amplifier circuit is greater than or equal to 300°/s which is a normal detection range of a moving object, and thus, there is a slight possibility of exceeding the dynamic range of the first amplifier circuit. For this reason, there is a slight possibility that an output of the first amplifier circuit is saturated at ordinary time, and thus, it is possible to obtain effects in which the possibility of false detection can be further reduced.

Application Example 4

In the physical quantity sensor according to the application example, it is preferable that the dynamic range of the first amplifier circuit is greater than or equal to 3000°/s.

According to this application example, if a very excessive impact such as being hit with stones is applied, or even if a print circuit board or a vehicle body in which a physical quantity sensor is mounted resonates, thereby amplifying an impact, there is a slight possibility of exceeding the dynamic range of the first amplifier circuit. For this reason, it is possible to obtain effects in which the possibility of false detection can be further reduced.

Application Example 5

In the physical quantity sensor according to the application example, it is preferable that the first amplifier circuit is an AC amplifier circuit, and the second amplifier circuit is a DC amplifier circuit.

According to this application example, an AC signal which is output from the physical quantity detection element is amplified, and is smoothed after synchronous detection is performed, and a signal including DC components is amplified. Accordingly, it is possible to efficiently amplify components corresponding to physical quantity which is detected.

Application Example 6

In the physical quantity sensor according to the application example, it is preferable that the physical quantity sensor further includes a first low pass filter which receives a signal from the synchronous detection circuit and outputs a signal to the second amplifier circuit, and a second low pass filter which receives a signal from the second amplifier circuit.

According to this application example, a signal which is smoothed by the first low pass filter is supplied to the second amplifier circuit, and high frequency noise can be reduced by the second low pass filter.

Application Example 7

An electronic apparatus according to this application example includes the physical quantity sensor described in the application example.

According to this application example, the physical quantity sensor described in the application example is included, and thus, it is possible to provide an electronic apparatus in which the possibility of an incorrect operation is reduced.

Application Example 8

A moving object according to this application example includes the physical quantity sensor described in the application example.

According to this application example, the physical quantity sensor described in the application example is included, and thus, it is possible to provide a moving object in which the possibility of an incorrect operation is reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments according to the invention will be described with reference to the drawings. Each member is illustrated in a recognizable size in each drawing below, and thus, each size is different from an actual size.

First Embodiment

In a first embodiment, an angular rate sensor 1 will be described as an example of a physical quantity sensor. The angular rate sensor 1 is a sensor which outputs a value of an angular rate with respect to rotation applied from the outside.

Schematic Configuration of Physical Quantity Sensor

Figure 1:
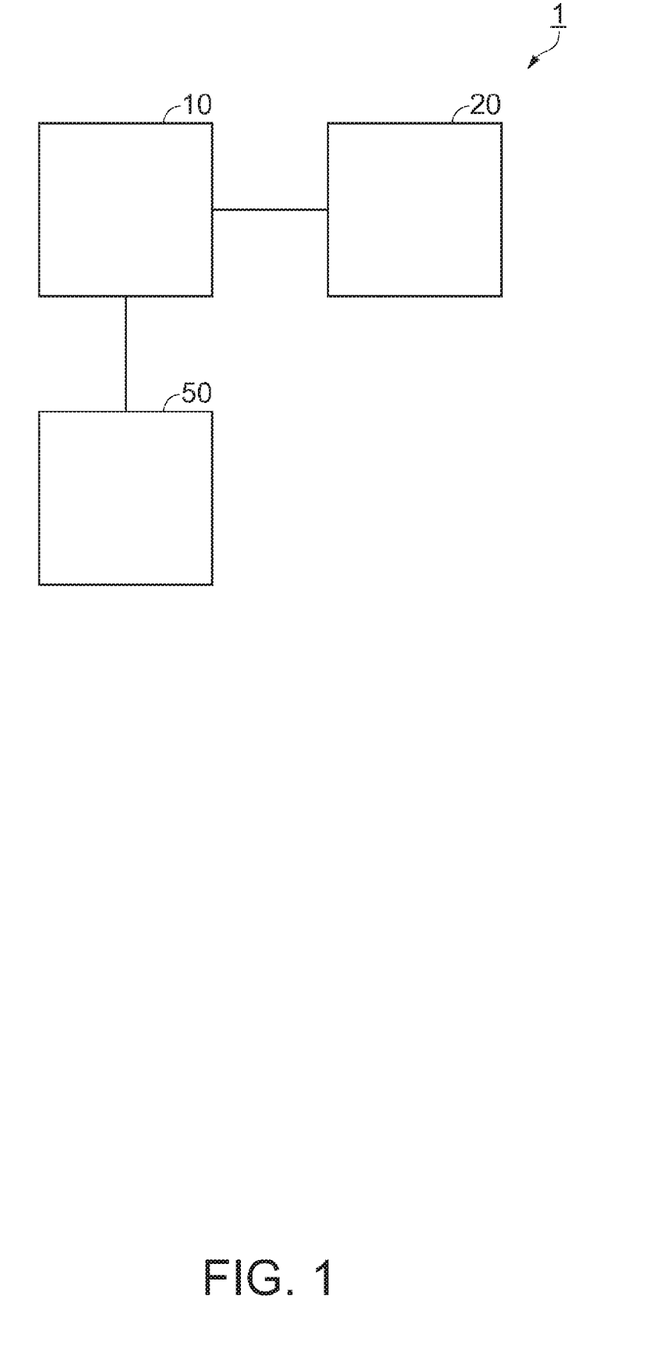
FIG. 1 is a schematic diagram of a physical quantity sensor according to a first embodiment.

FIG. 1 is a schematic diagram of the angular rate sensor 1 as an example of a physical quantity sensor.

The angular rate sensor 1 is configured by an angular rate detection element 10, an angular rate detection circuit 20, a drive circuit 50, and the like.

The angular rate detection element 10 is an example of a physical quantity detection element according to the invention, and vibrates in accordance with angular rate which is applied to the angular rate sensor 1. The angular rate detection circuit 20 is an example of a physical quantity detection circuit according to the invention, and processes an angular rate signal which is output from the angular rate detection element 10. The drive circuit 50 generates a drive signal for making the angular rate detection element 10 perform drive vibration.

Schematic Configuration of Physical Quantity Detection Element

Figure 2:
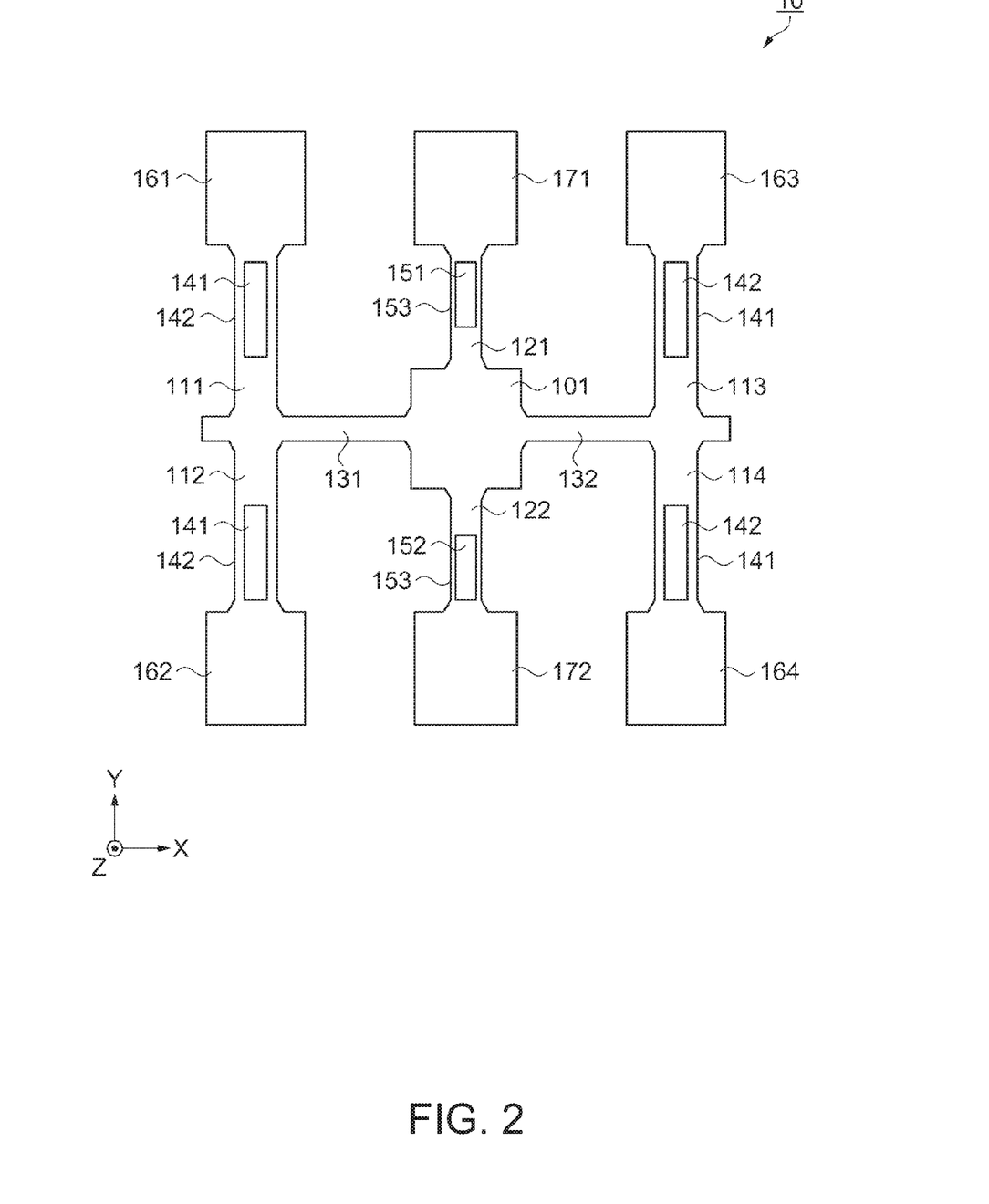
FIG. 2 is a schematic diagram of a physical quantity detection element included in the physical quantity sensor according to the first embodiment.

FIG. 2 is a schematic diagram of the angular rate detection element 10 as an example of a physical quantity detection element. The angular rate detection element 10 is configured by a base section 101, a first drive arm 111, a second drive arm 112, a third drive arm 113, a fourth drive arm 114, a first detection arm 121, a second detection arm 122, a first connection arm 131, a second connection arm 132, first drive electrodes 141, second drive electrodes 142, a first detection electrode 151, a second detection electrode 152, third detection electrodes 153, a first drive weight section 161, a second drive weight section 162, a third drive weight section 163, a fourth drive weight section 164, a first detection weight section 171, a second detection weight section 172, and the like. The angular rate detection element 10 is formed from a Z-cut crystal substrate in a preferred example. In addition, the first drive electrode 141, the second drive electrode 142, and the first to third detection electrodes 151 to 153 are formed of gold (Au) and chrome (Cr) in a preferred example.

In FIG. 2, a direction along the connection arm is defined as the X-direction, a direction along the drive arm is defined as the Y-direction, and a direction perpendicular to a bottom surface is defined as the Z-direction.

The base section 101 is an approximately rectangular shape, in a planar view.

The first connection arm 131 extends in the −X-direction from a side surface on a −X side along an YZ plane of the base section 101. The first drive arm 111 extends in the +Y-direction from a tip portion of the first connection arm 131, and the second drive arm 112 extends in the −Y-direction from the tip portion of the first connection arm 131. The first drive weight section 161 with a greater width along the X-direction than that of the first drive arm 111 is provided in a tip portion of the first drive arm 111. In addition, the second drive weight section 162 with a greater width along the X-direction than that of the second drive arm 112 is provided in a tip portion of the second drive arm 112.

The second connection arm 132 extends in the +X-direction from a side surface on a +X side along an YZ plane of the base section 101. The third drive arm 113 extends in the +Y-direction from vicinity of a tip portion of the second connection arm 132, and the fourth drive arm 114 extends in the −Y-direction from the vicinity of the tip portion of the second connection arm 132. The third drive weight section 163 with a greater width along the X-direction than that of the third drive arm 113 is provided in a tip portion of the third drive arm 113. In addition, the fourth drive weight section 164 with a greater width along the X-direction than that of the fourth drive arm 114 is provided in a tip portion of the fourth drive arm 114.

The first detection arm 121 extends in the +Y-direction from a side surface on the +Y-direction along an XZ plane of the base section 101. The first detection weight section 171 with a greater width along the X-direction than that of the first detection arm 121 is provided in a tip portion of the first detection arm 121. In addition, the second detection arm 122 extends in the −Y-direction from a side surface on the −Y-direction along the XZ plane of the base section 101. The second detection weight section 172 with a greater width along the X-direction than that of the second detection arm 122 is provided in a tip portion of the second detection arm 122.

The first drive electrodes 141 are respectively provided on surfaces along XY planes of the first drive arm 111 and the second drive arm 112, and on surfaces along the YZ planes of the third drive arm 113 and the fourth drive arm 114. An AC current is supplied to the first drive electrode 141. In addition, the second drive electrodes 142 are respectively provided on surfaces along YZ planes of the first drive arm 111 and the second drive arm 112, and on surfaces along the XY planes of the third drive arm 113 and the fourth drive arm 114. An AC current with a reverse phase with respect to the current which is supplied to the first drive electrode 141 is supplied to the second drive electrode 142.

The first detection electrode 151 is provided on a surface along the XY plane of the first detection arm 121, and the second detection electrode 152 is provided on a surface along the XY plane of the second detection arm 122. In addition, the third detection electrodes 153 are respectively provided on surfaces along the YZ plane of the first detection arm 121 and the second detection arm 122.

Operation of Physical Quantity Detection Element

Figure 3A:
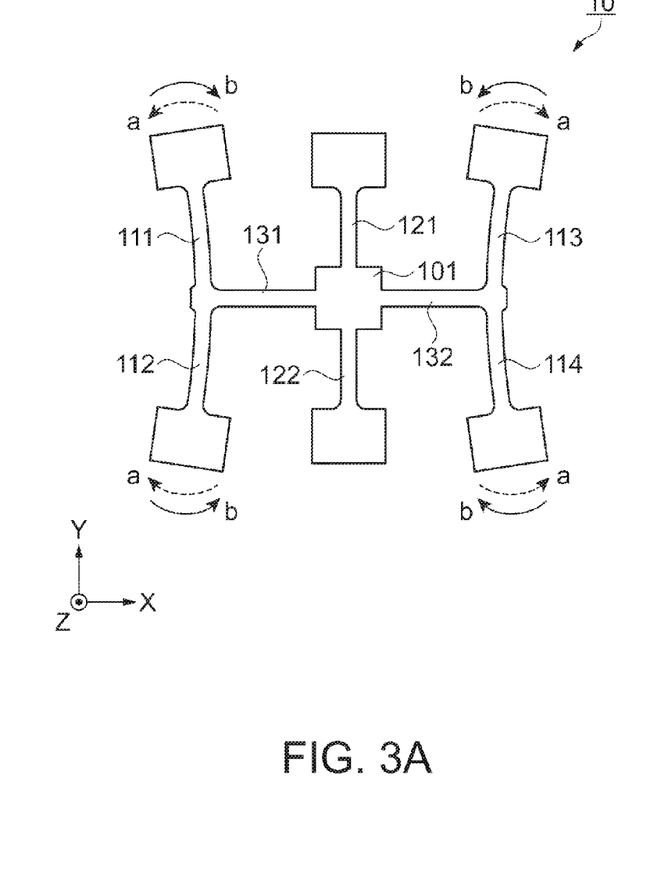
FIG. 3A is a schematic diagram illustrating an operation of drive vibration of a physical quantity detection element.
Figure 3B:
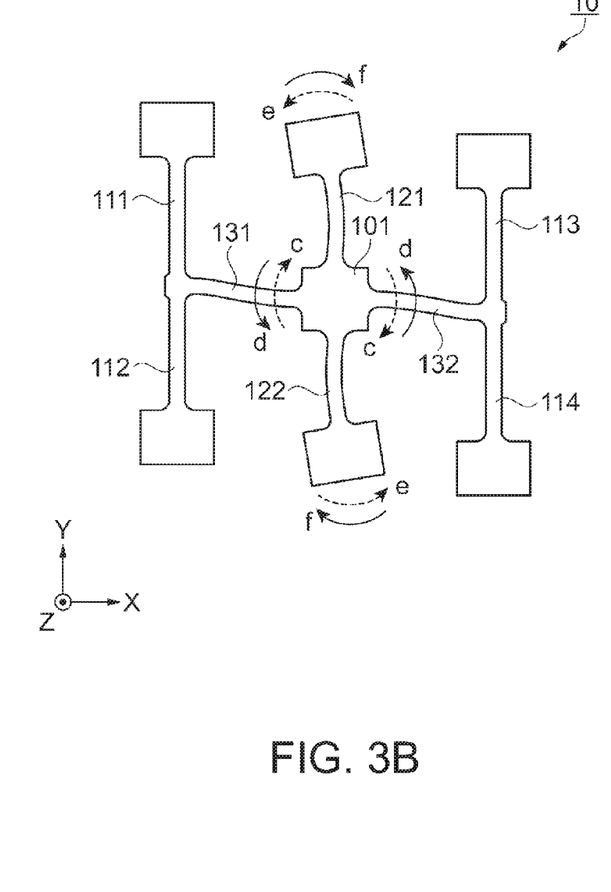
FIG. 3B is a schematic diagram illustrating an operation of detection vibration of a physical quantity detection element.

FIGS. 3A and 3B are schematic diagrams illustrating an operation of the angular rate detection element 10 as an example of physical quantity detection element. FIG. 3A is a schematic diagram illustrating a vibration operation of the angular rate detection element 10 in a stationary state (state in which angular rate around the Z-direction is not applied to the angular rate detection element 10), and FIG. 3B is a schematic diagram illustrating the vibration operation of the angular rate detection element 10 in an rotation state (state in which the angular rate around the Z-direction is applied to the angular rate detection element 10).

In a stationary state of the angular rate detection element 10, an AC drive signal is applied from the drive circuit 50 to the first drive electrode 141 and the second drive electrode 142 (refer to FIG. 2) which are provided on the first drive arm 111 to the fourth drive arm 114. Then the first drive arm 111 and the third drive arm 113 perform bending motion (drive vibration) in the X-direction by means of inverse piezoelectric effects so as to approach each other or to be separated from each other, as denoted by arrows a and b of FIG. 3A. In addition, the second drive arm 112 and the fourth drive arm 114 perform bending motion (drive vibration) so as to approach each other or to be separated from each other.

Ideally, the bending vibration is symmetrical to an axis of the first detection arm 121 and the second detection arm 122, and the first detection arm 121 and the second detection arm 122 are stationary. However, in actual fact, the bending vibration is not symmetrical but is unbalanced due to asymmetry of the angular rate detection element 10 which is formed in the process of manufacture. Due to this, vibration with approximately the same phase as the drive vibration is generated also in the first detection arm 121 and the second detection arm 122, even in a stationary state. Hereinafter, this kind of vibration is referred to as leakage vibration. In addition, a signal which overlaps a detection signal due to the leakage vibration and has approximately the same phase as the drive signal is referred to as a leakage signal.

Here, if rotation around the Z-axis is applied to the angular rate detection element 10, Coriolis force is applied to the first drive arm 111 to the fourth drive arm 114. The Coriolis force acts in the Y-direction, and is proportional to the magnitude of angular rate which is applied. As a result, the first connection arm 131 and the second connection arm 132 vibrate in the Y-axis direction, as denoted by arrows c and d of FIG. 3B. According to this, the first detection arm 121 and the second detection arm 122 vibrate in the X-axis direction, as denoted by arrows e and f of FIG. 3B. Then, an AC detection signal is generated from the first detection electrode 151 and the second detection electrode 152 which are provided on the first detection arm 121 and the second detection arm 122 by piezoelectric effects. The detection signal has a phase shifted by 90° from those of the drive signal and the leakage signal. As the detection signal is processed by a detection circuit, it is possible to detect the magnitude of angular rate which is applied to the angular rate detection element 10.

Schematic Configuration of Physical Quantity Detection Circuit

Figure 4:
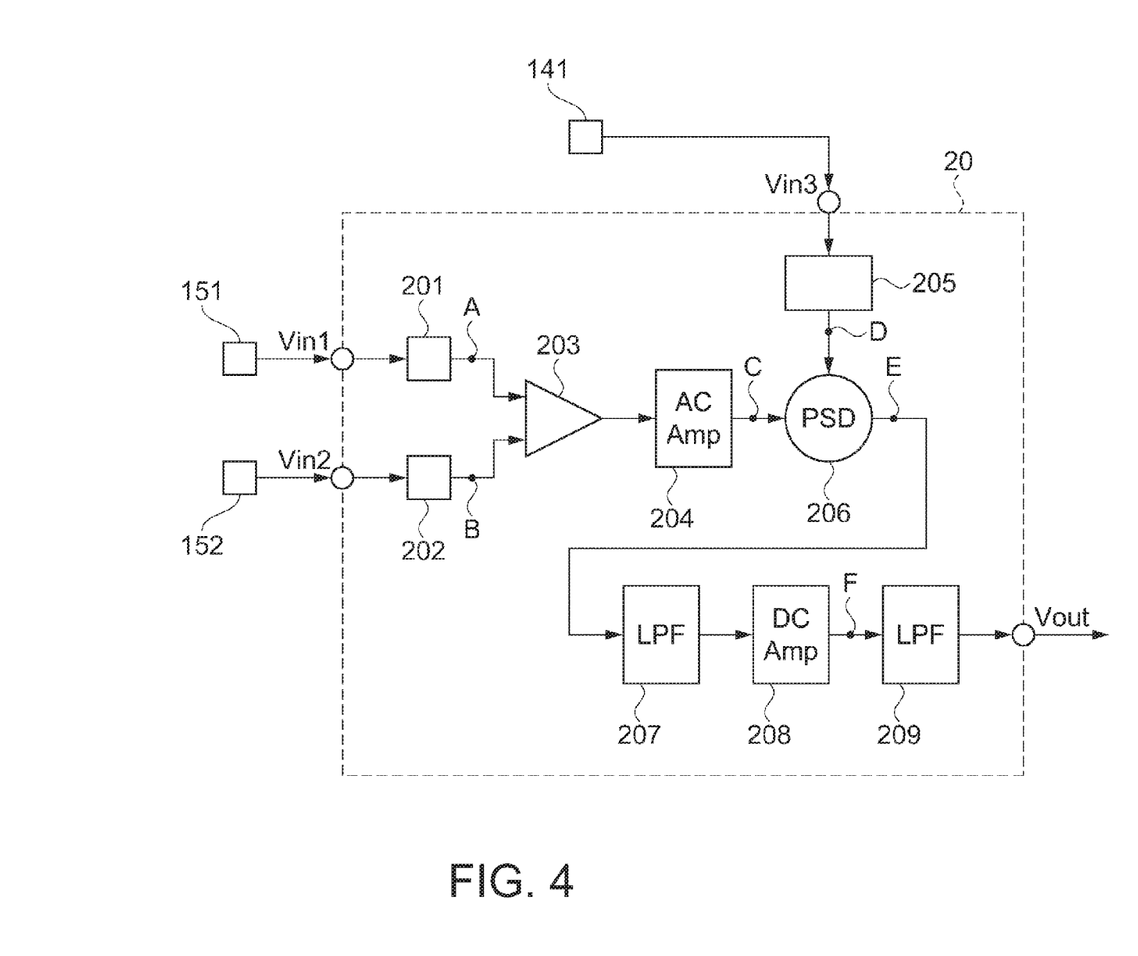
FIG. 4 is a schematic diagram of a physical quantity detection circuit included in the physical quantity sensor according to the first embodiment.

FIG. 4 is a schematic diagram of the angular rate detection circuit 20 as an example of a physical quantity detection circuit. The angular rate detection circuit 20 is configured by a first charge amplifier 201, a second charge amplifier 202, a differential amplifier circuit 203, a first amplifier circuit 204, a phase shift circuit 205, a synchronous detection circuit 206, a first low pass filter 207, a second amplifier circuit 208, a second low pass filter 209, and the like.

A signal from the first detection electrode 151 is input to the angular rate detection circuit 20 through a first input terminal Vin1. In addition, a signal from the second detection electrode 152 is input to the angular rate detection circuit 20 through a second input terminal Vin2. In addition, a signal from the first drive electrode 141 is input to the angular rate detection circuit 20 through a third input terminal Vin3. An output signal of the angular rate detection circuit 20 is output to the outside through an output terminal Vout.

The first charge amplifier 201 converts electric charges which are input from the first input terminal Vin1 into a voltage signal. In addition, the second charge amplifier 202 converts electric charges which are input from the second input terminal Vin2 into a voltage signal. The differential amplifier circuit 203 performs a differential amplification of output voltages from the first charge amplifier 201 and the second charge amplifier 202. As a result, same phase components included in the output voltages from the first charge amplifier 201 and the second charge amplifier 202 are reduced, and reverse phase components included in the output voltages are amplified.

The first amplifier circuit 204 is an AC amplifier circuit, and performs an AC amplification of an output of the differential amplifier circuit 203. The phase shift circuit 205 changes a phase of a signal from the third input terminal Vin3 by approximately 90°, and generates a clock signal which is a reference of synchronous detection from the drive signal. The synchronous detection circuit 206 performs synchronous detection of a signal which is output from the first amplifier circuit 204, using the clock signal which is output from the phase shift circuit 205. As a result, it is possible to extract components of the same phase as the detection signal, from a signal which is output from the first amplifier circuit 204. The first low pass filter 207 smoothes a signal from the synchronous detection circuit 206, and removes unnecessary wave components. The second amplifier circuit 208 is a DC amplifier circuit, and performs DC amplification of a signal from the first low pass filter 207. The second low pass filter 209 limits a frequency band of a signal from the second amplifier circuit 208.

In the angular rate detection circuit 20, a dynamic range of the second amplifier circuit 208 is set more greatly than that of the first amplifier circuit 204. Here, the dynamic range is a minimum value of a magnitude of an input physical quantity in which an output of a circuit unit is saturated. The dynamic range is determined by multiplication of gains of each circuit element in a preceding stage of the circuit unit, and a saturation voltage of the circuit unit.

In addition, it is preferable that the dynamic range of the second amplifier circuit 208 is set to a value which is approximately double the dynamic range of the first amplifier circuit 204. As a result, even if amplification rates of the first amplifier circuit 204 and the second amplifier circuit 208 are varied by manufacturing variation, it is possible to increase the dynamic range of the second amplifier circuit 208 more greatly than that of the first amplifier circuit 204.

In order to find the magnitude of the dynamic range, outputs of the first amplifier circuit 204 and the second amplifier circuit 208 are monitored while applying physical quantity, the physical quantity is gradually increased, and thereby it may be examined which one of the outputs of the first amplifier circuit 204 and the second amplifier circuit 208 is saturated.

Hence, the amplification rates of the first amplifier circuit 204 and the second amplifier circuit 208 are determined in accordance with the examination results, such that a minimum value of an input physical quantity in which an output of the second amplifier circuit 208 is saturated more than a minimum value of an input physical quantity in which an output of the first amplifier circuit 204 is saturated. As a result, it is possible to set the magnitude of the dynamic range.

Hereinafter, a saturation voltage of the first amplifier circuit 204 is referred to as V1, and an amplification rate of the first amplifier circuit 204 is referred to as A1. In addition, a saturation voltage of the second amplifier circuit 208 is referred to as V2, and an amplification rate of the second amplifier circuit 208 is referred to as A2.

A magnitude relationship between V2/A2 and V1/A1 becomes V2/A2>V1/A1. In a preferred example, V1=V2=5V, A1=10, A2=2, and V2/A2=2.5>V1/A1=0.5. Hence, at this time, the minimum value of an input voltage in which the second amplifier circuit 208 is saturated is 2.5 V, and the minimum value of an input voltage in which the first amplifier circuit 204 is saturated is 0.5 V. That is, the second amplifier circuit 208 is harder to be saturated than the first amplifier circuit 204. Hence, in a preferred example, A1 and A2 are set as described above, and thus, it is possible to have a configuration in which the dynamic range of the second amplifier circuit 208 is greater than that of the first amplifier circuit 204.

In addition, the dynamic range of the first amplifier circuit 204 is greater than or equal to 300°/s which is a normal detection range of a moving object such as an automobile. That is, the output of the first amplifier circuit 204 is set so as not to be saturated, if physical quantity corresponding to angular rate less than or equal to 300°/s is applied. As a result, if the angular rate sensor 1 is mounted in a moving object, it is possible to have a configuration in which it is also difficult for the first amplifier circuit 204 to be saturated at the time of normal use.

In addition, at this time, the dynamic range of the second amplifier circuit 208 is greater than or equal to 600°/s.

It is more preferable that the dynamic range of the first amplifier circuit 204 is greater than or equal to 3000°/s. That is, the output of the first amplifier circuit 204 is set so as not to be saturated, if physical quantity corresponding to angular rate less than or equal to 3000°/s is applied.

If the angular rate sensor 1 is mounted in a moving object such as an automobile, it is assumed that the moving object travels on a gravel road or a bad road. In this case, an impact exceeding a normal detection range can be applied to the moving object by being hit with stones or the like. In addition, if a print circuit board or a vehicle body in which a physical quantity sensor is mounted resonates, physical quantity which is input is amplified by a Q value of resonance. In general, the Q value of the resonance is approximately 5. If margin is set twice, the dynamic range of the first amplifier circuit 204 can be set more greatly than or equal to 300°/s×(5×2)=3000°/s, and thereby it is possible to reduce the possibility that the output of the first amplifier circuit 204 is saturated, even if being affected by being hit with stones, or resonance of a print circuit board or a vehicle body.

In addition, at this time, the dynamic range of the second amplifier circuit 208 is greater than or equal to 6000°/s.

Signal Processing of Physical Quantity Detection Circuit

FIGS. 5A to 5F are waveform diagrams illustrating signal waveforms when the angular rate sensor 1 is in a stationary state. In a stationary state, an angular rate signal is not output from the first detection electrode 151 and the second detection electrode 152, and a leakage signal is output. FIGS. 5A to 5F illustrate changes of the leakage signal of the respective points A to F illustrated in FIG. 4. A horizontal axis denotes time, and a vertical axis denotes a voltage.

Figure 5A:
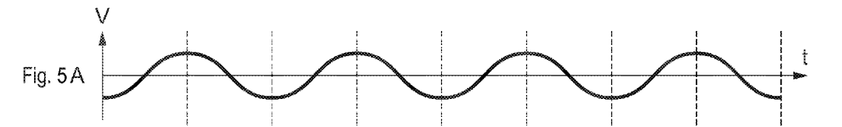
FIGS. 5A to 5F are waveform diagrams illustrating an operation of the physical quantity detection circuit, which is included in the physical quantity sensor according to the first embodiment, with respect to a leakage signal.
Figure 5B:
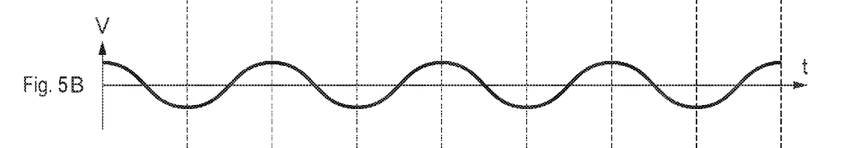

Leakage signals with reverse phases (phase is shifted by 180°) each other are output to an A point (output of the first charge amplifier 201) and a B point (output of the second charge amplifier 202).

Figure 5C:
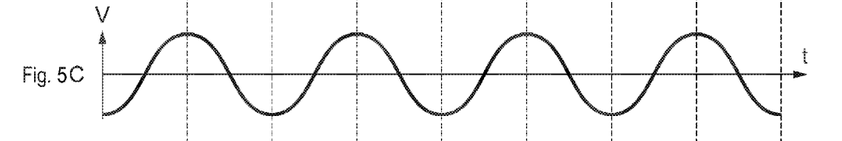

A signal which is amplified by the first amplifier circuit 204 is output to a C point (output of the first amplifier circuit 204) after the outputs at the A point and the B point using the differential amplifier circuit 203 is differentially amplified.

Figure 5D:
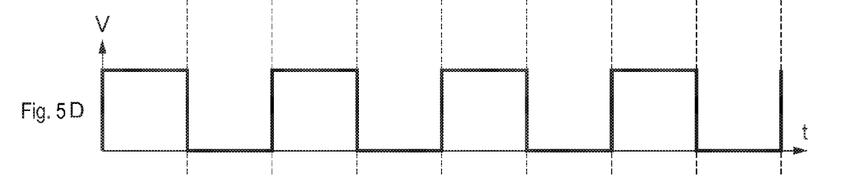

A clock signal for synchronous detection is output to a D point (output of the phase shift circuit 205). The leakage signal has approximately the same phase as the drive signal, and in contrast to this, a phase of the clock signal is shifted from the drive signal by approximately 90°. For this reason, there is shift of approximately 90° between the clock signal and the leakage signal.

Figure 5E:
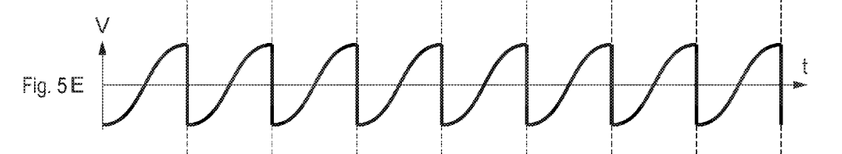

A signal which is obtained by multiplying a signal of the C point and a signal of the D point together is output to an E point (output of the synchronous detection circuit 206). For this reason, an output of the E point has a sawtooth shape in which areas of the top and the bottom of a reference voltage are the same as each other, as illustrated.

Figure 5F:
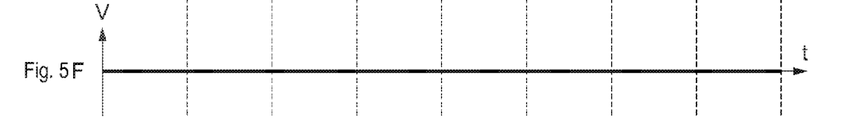

A signal which is obtained by integrating an output of the E point using the first low pass filter 207 and by amplifying the integrated signal using the second amplifier circuit 208 is output to an F point (output of the second amplifier circuit 208). If the output of the E point is integrated, the leakage signal is offset so as to be equal to the reference voltage, and thereby the output of the F point is also equal to the reference voltage.

FIGS. 6A to 6F are waveform diagrams illustrating signal waveforms when the angular rate sensor 1 is in a rotation state. In a rotation state, an angular rate signal and a leakage signal which overlap each other are output from the first detection electrode 151 and the second detection electrode 152. The leakage signal is offset in the same manner as in the stationary state, and thus, FIGS. 6A to 6F illustrate only changes of the angular rate signal in the respective points A to F. A horizontal axis denotes time, and a vertical axis denotes a voltage.

Figure 6A:
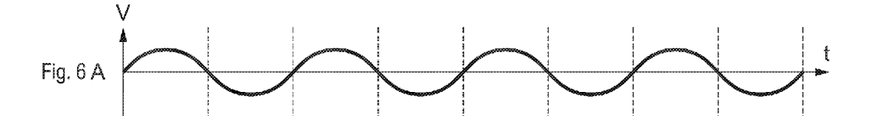
FIGS. 6A to 6F are waveform diagrams illustrating the operation of the physical quantity detection circuit, which is included in the physical quantity sensor according to the first embodiment, with respect to a physical quantity signal.
Figure 6B:
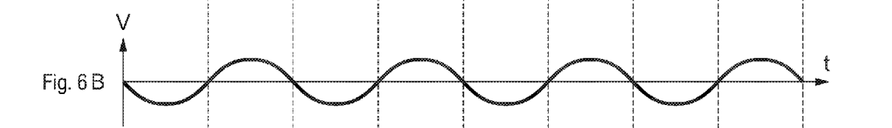

Angular rate signals with reverse phases (phase is shifted by 180°) each other are output to an A point (output of the first charge amplifier 201) and a B point (output of the second charge amplifier 202).

Figure 6C:
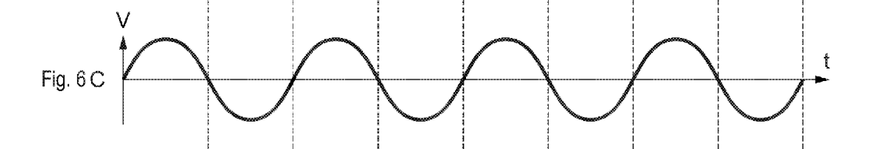
Figure 6D:
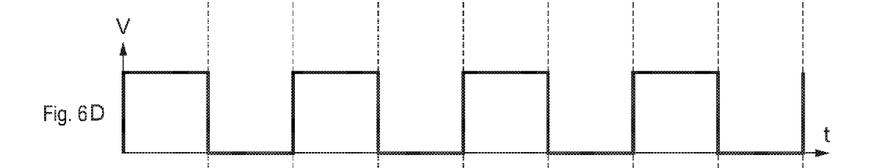

A signal which is amplified by the first amplifier circuit 204 is output to a C point (output of the first amplifier circuit 204) after the outputs at the A point and the B point using the differential amplifier circuit 203 is differentially amplified. It is possible to amplify only AC components using the first amplifier circuit 204 which is the AC amplifier circuit, without changing a reference voltage of the signal which is output from the differential amplifier circuit 203.

A clock signal for synchronous detection is output to a D point (output of the phase shift circuit 205). A phase of the angular rate signal is shifted from a phase of the drive signal by approximately 90°, and a phase of the clock signal is shifted from the phase of the drive signal by approximately 90°. For this reason, the clock signal and the angular rate signal have same phases as or reverse phases of each other according to a direction of rotation. The examples illustrated in FIGS. 6A to 6F illustrate a case in which the clock signal and the angular rate signal have the same phase as each other.

Figure 6E:
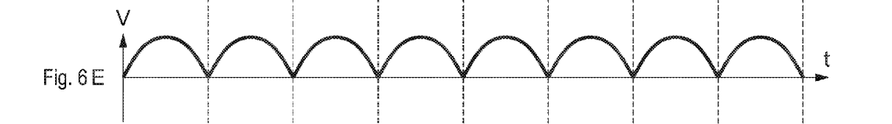

A signal which is obtained by multiplying a signal of the C point and a signal of the D point together is output to an E point (output of the synchronous detection circuit 206). For this reason, an output of the E point has a waveform which is obtained by performing full-wave rectification of a signal of the C point, as illustrated.

Figure 6F:
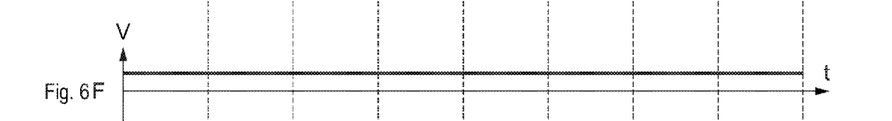

A signal which is obtained by integrating an output of the E point using the first low pass filter 207 and by amplifying the integrated signal using the second amplifier circuit 208 is output to an F point (output of the second amplifier circuit 208). Since the output from the first low pass filter 207 is a DC current, it is possible to output a DC signal according to the angular rate to the F point using the second amplifier circuit 208 which is a DC amplifier circuit. In addition, it is possible to remove noise of a high frequency using the second low pass filter 209.

Output when Excessive Physical Quantity is Applied

Figure 7A:
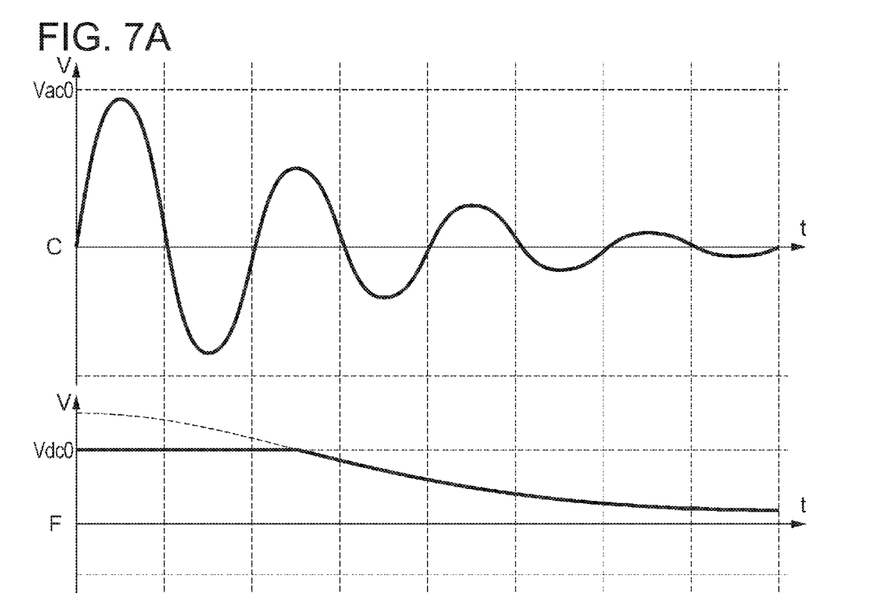
FIG. 7A is an output waveform diagram of the physical quantity detection circuit included in a physical quantity sensor according to an example of the related art.
Figure 7B:
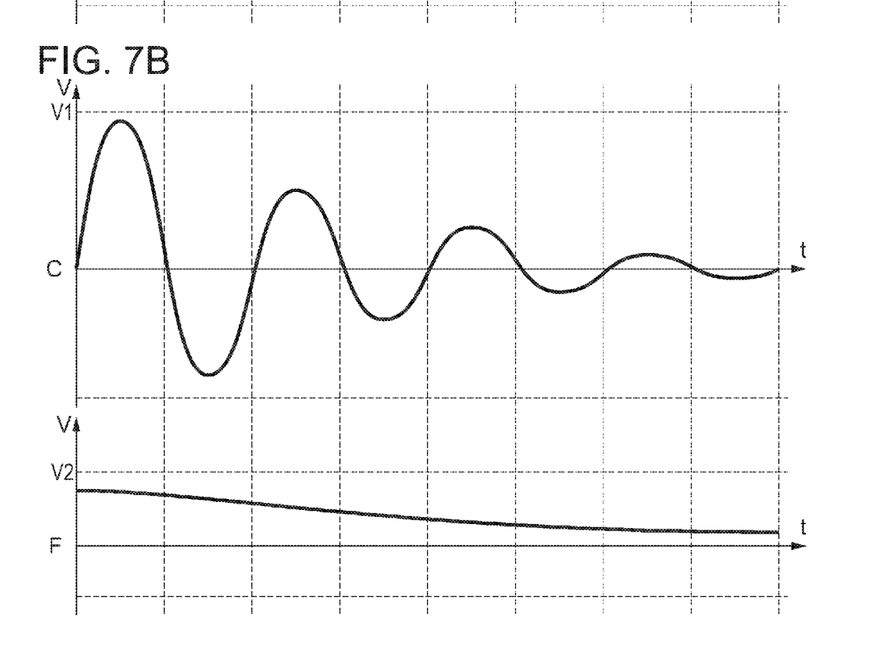
FIG. 7B is an output waveform diagram of the physical quantity detection circuit included in the physical quantity sensor according to the first embodiment.

FIGS. 7A and 7B are waveform diagrams illustrating signal waveforms when excessive physical quantity is applied to angular rate sensor 1. A horizontal axis denotes time, and a vertical axis denotes an output voltage. FIG. 7A is output waveforms of an angular rate sensor of the related art, and illustrates signal waveforms of the C point and the F point. In addition, Vac0 is a saturation voltage of the first amplifier circuit 204, and Vdc0 is a saturation voltage of the second amplifier circuit 208.

FIG. 7B is output waveforms of the angular rate sensor 1 according to the present embodiment, and illustrates signal waveforms of the C point and the F point. V1 is a saturation voltage of the first amplifier circuit 204, V2 is a saturation voltage of the second amplifier circuit 208, and V1=V2=5V is satisfied in a preferred embodiment. In addition, the lower limit of the output voltage is 0 V, and the reference voltage denoted by a height of a horizontal axis is 2.5 V.

In the angular rate sensor of the related art, if an excessive angular rate is applied, the amplification rate of the first amplifier circuit 204 decreases, and the output does not exceed the saturation voltage Vac0. Hence, in order to maintain a constant output level of the angular rate sensor, the amplification rate of the second amplifier circuit 208 is increased by the amount of a decrease of the amplification rate of the first amplifier circuit 204, and thus, there is a possibility that the output of the second amplifier circuit 208 exceeds the saturation voltage Vdc0. As a result, there is a possibility that the output of the F point is saturated thereby being inaccurate, as illustrated in FIG. 7A.

Meanwhile, in the angular rate sensor 1 according to the present embodiment, the dynamic range of the second amplifier circuit 208 is greater than that of the first amplifier circuit 204, and thus, the output of the second amplifier circuit 208 also does not exceed the saturation voltage V2 and is not saturated as illustrated in FIG. 7B, if the output of the first amplifier circuit 204 does not exceed the saturation voltage V1. In addition, even if angular rate or an impact which exceeds the dynamic range of the first amplifier circuit 204 is applied and the output of the first amplifier circuit 204 is saturated, the output of the first amplifier circuit 204 does not exceed the dynamic range of the first amplifier circuit 204, and thus, the output of the second amplifier circuit 208 does not exceed the angular rate V2, and is not saturated.

As described above, according to the angular rate sensor 1, it is possible to obtain the following effects.

That is, even if an excessive angular rate or an excessive impact is applied, it is possible to prevent the second amplifier circuit 208 from being saturated. For this reason, it is possible to provide a sensor in which an incorrect output is reduced. In addition, it is possible to reduce an incorrect output without complicating a circuit configuration, compared to a configuration in which the amplification rate of the differential amplifier circuit 203 or the synchronous detection circuit 206 is variable in the same manner as in the angular rate sensor of the related art.

In addition, since the dynamic range of the first amplifier circuit 204 is greater than or equal to 300°/s, it can also be difficult for the output of the first amplifier circuit 204 to be saturated, and it is possible to further reduce the possibility that the output of the sensor is incorrect, at the time of normal use in a case in which the angular rate sensor is mounted in a moving object such as an automobile. In addition, since the dynamic range of the second amplifier circuit 208 is set more greatly than or equal to approximately double of 600°/s, it is possible to reliably prevent the output of the second amplifier circuit 208 from being saturated, without being affected by manufacturing variation or the like.

Furthermore, since the dynamic range of the first amplifier circuit 204 is greater than or equal to 3000°/s, it is possible to reduce the possibility that the output of the first amplifier circuit 204 is saturated, even if an impact such as being hit with stones is applied while travelling on a gravel road or bad road in a state in which the angular rate sensor is mounted in a moving object, or even if a print circuit board or a vehicle body in which the physical quantity sensor is mounted resonates. For this reason, it is possible to further reduce the possibility that the output of the sensor is incorrect. In addition, since the dynamic range of the second amplifier circuit 208 is set more greatly than or equal to 6000°/s which is double the dynamic range of the second amplifier circuit 208, it is possible to reliably prevent the output of the second amplifier circuit 208 from being saturated.

Second Embodiment

Schematic Configuration of Physical Quantity Sensor

Next, an angular rate sensor 1a according to a second embodiment will be described.

Figure 8:
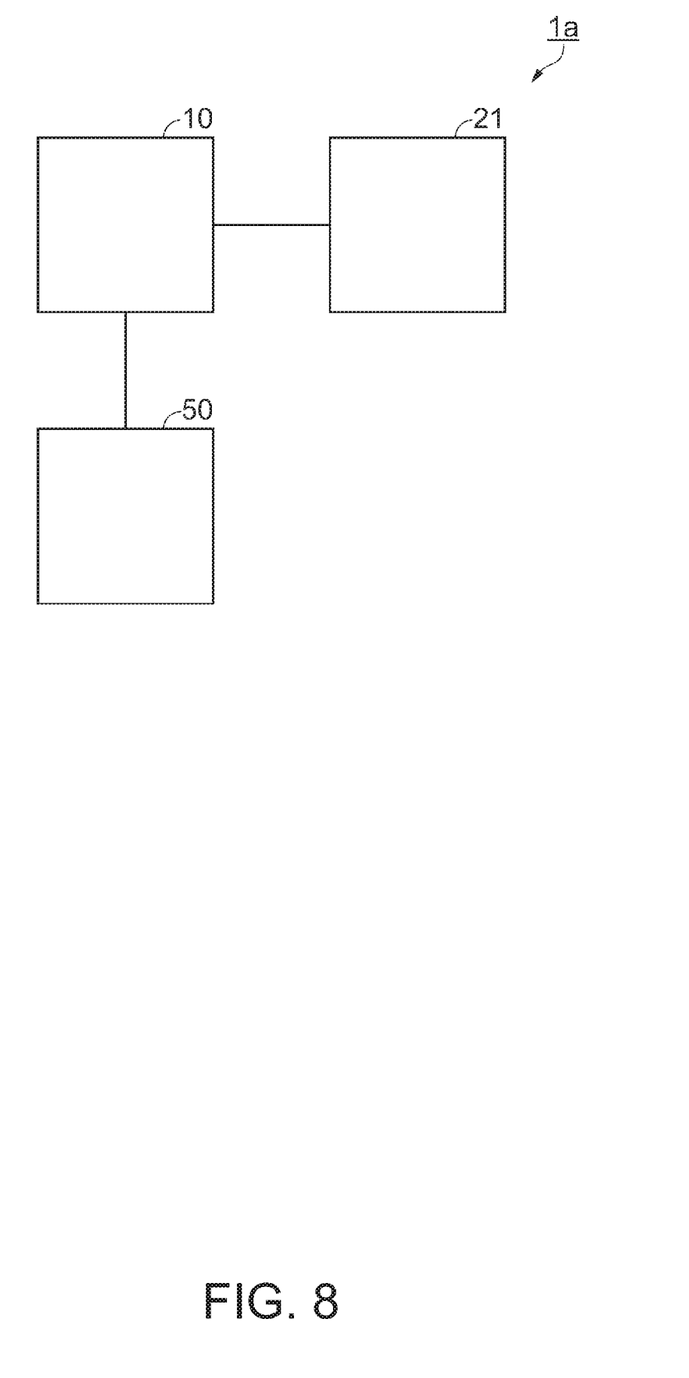
FIG. 8 is a schematic diagram of a physical quantity sensor according to a second embodiment.

FIG. 8 is a schematic diagram of the physical quantity sensor 1a. The angular rate sensor 1a is configured by the angular rate detection element 10, an angular rate detection circuit 21, the drive circuit 50, and the like.

The angular rate detection element 10 is an example of the physical quantity detection element according to the invention, and vibrates in accordance with angular rate which is applied to the angular rate sensor 1a. The angular rate detection circuit 21 is an example of the physical quantity detection circuit according to the invention, and processes an angular rate signal which is output from the angular rate detection element 10. The drive circuit 50 generates a drive signal for making the angular rate detection element 10 perform drive vibration.

Schematic Configuration of Physical Quantity Detection Circuit

Next, the angular rate detection circuit 21 included in the angular rate sensor 1a according to the second embodiment will be described with reference to FIG. 9. The same reference numerals or symbols will be attached to the same configuration elements as in the first embodiment, and repeated description will be omitted.

Figure 9:
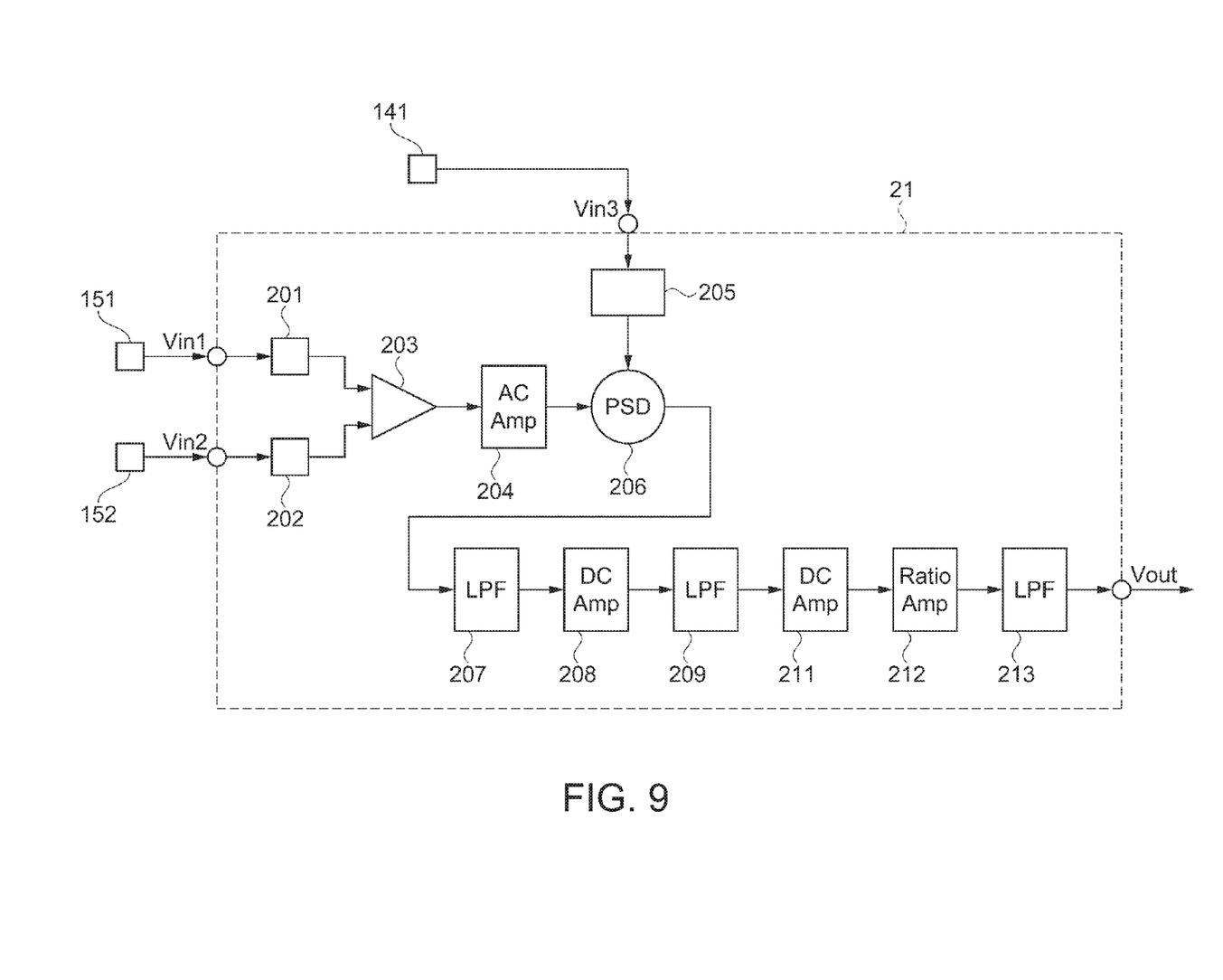
FIG. 9 is a schematic diagram of a physical quantity detection circuit included in the physical quantity sensor according to the second embodiment.

FIG. 9 is a schematic diagram of the angular rate detection circuit 21.

The angular rate detection circuit 21 includes a third amplifier circuit 211, a ratiometric amplifier 212, a third low pass filter 213, and the like, in addition to the configuration of the angular rate detection circuit 20 included in the angular rate sensor 1 according to the first embodiment.

The third amplifier circuit 211 is a DC amplifier circuit, and determines detection sensitivity of a final angular rate. It is preferable that the dynamic range of the third amplifier circuit 211 is greater than that of the second amplifier circuit 208. The ratiometric amplifier 212 is an amplifier circuit which changes an amplification rate in accordance with a power supply voltage. As a result, even though the power supply voltage varies, it is possible to provide a configuration in which the sensitivities of the angular rate sensors are interlocked. In addition, the third low pass filter 213 is a filter circuit which removes unnecessary components of the detection signal.

As described above, according to the physical quantity sensor 1a of the present embodiment, it is possible to obtain the following effects in addition to the effects of the first embodiment.

That is, by including the third amplifier circuit 211 in addition to the second amplifier circuit 208, it is possible to decrease the amplification rate of the second amplifier circuit. As a result, it is possible to reliably increase the dynamic range of the second amplifier circuit 208 without a decrease of the final sensitivity. In addition, it is possible to further reduce noise included in the detection signal by including the third low pass filter 213.

Modification Example

The invention is not limited to the above-described embodiments, and various modifications, improvement, or the like can be made for the above-described embodiments. The modifications will be described as below.

Physical quantity which is detected by the physical quantity sensor according to the present embodiment is not limited to angular rate, and may be, for example, acceleration, pressure, or the like.

In addition, in the above-described embodiments, the angular rate detection element 10 is a so-called double-T type which includes four drive arms and two detection arms, but the physical quantity detection element included in the physical quantity sensor according to the present embodiment is not limited to this. For example, the angular rate detection element 10 may be a tuning fork type vibrator which includes two vibration arms, and may be a so-called H-type vibrator in which two drive arms and two detection arms extend in a direction opposite to each other. Also, the physical quantity detection element may be a capacitance detection type including a comb-toothed type electrode. In addition, a material of the physical quantity detection element is not limited to crystal, and may be, for example, silicon or ceramic.

Third Embodiment

Schematic Configuration of Electronic Apparatus

In a third embodiment, a roll detection device 3 will be described as an example of an electronic apparatus.

The roll detection device 3 is mounted in a moving object such as an automobile, detects roll, based on outputs of an angular rate sensor and an acceleration sensor, and actuates a protection device such as an air bag.

Figure 10:
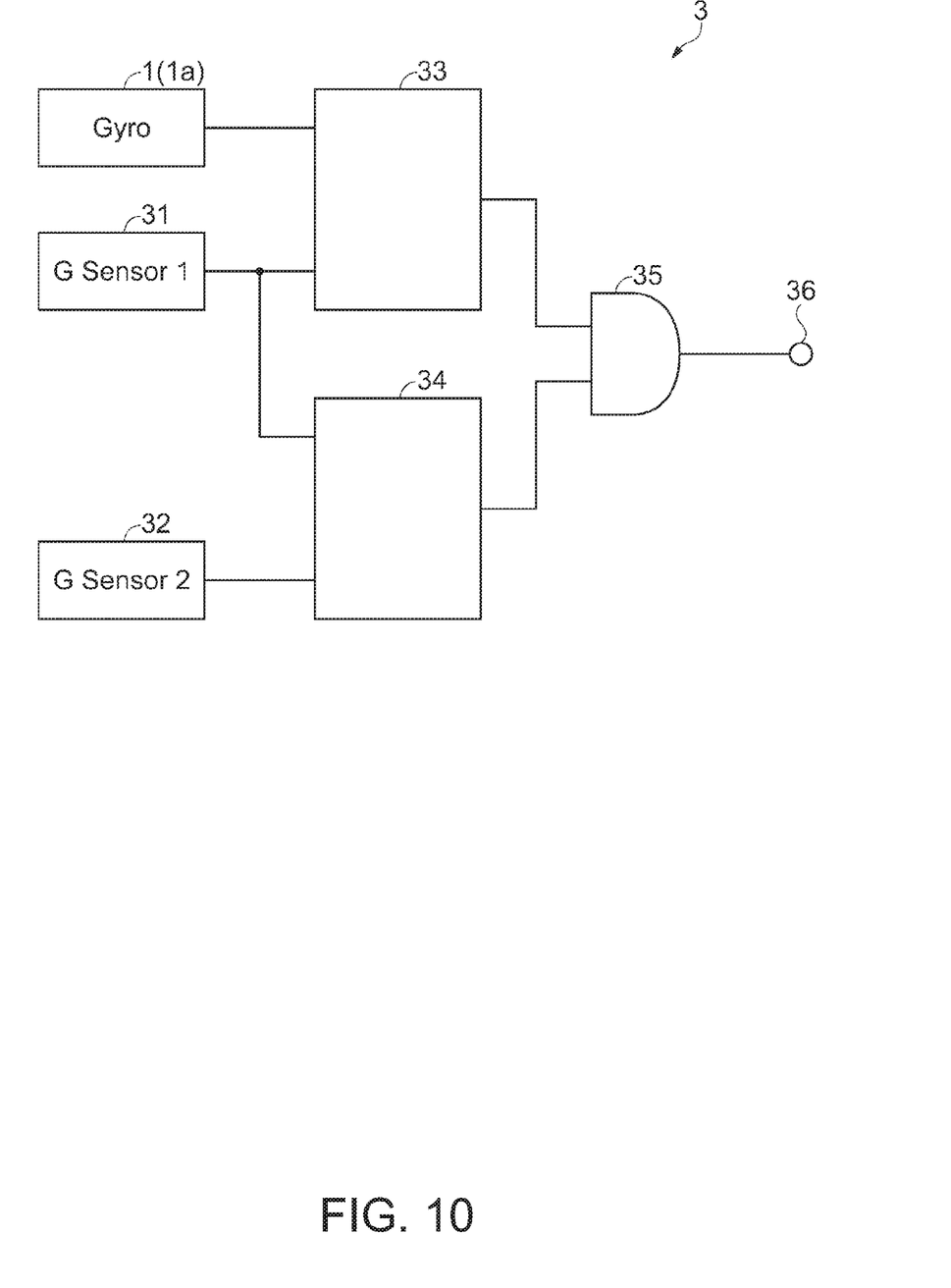
FIG. 10 is a schematic diagram of an electronic apparatus according to a third embodiment.

FIG. 10 is a schematic diagram of the roll detection device 3.

The roll detection device 3 is configured by the angular rate sensor 1 (1a), a first acceleration sensor 31, a second acceleration sensor 32, a first roll determination circuit 33, a second roll determination circuit 34, an AND circuit 35, a roll signal output terminal 36, and the like. Hereinafter, an example in which the angular rate sensor 1 according to the first embodiment is included is described, but an angular rate sensor according to other embodiments or modifications may be used.

The angular rate sensor 1 detects angular rate (roll rate) of a rotation direction (roll direction) in which a travelling direction of a moving object which includes the roll detection device 3 is used as an axis. The output of the angular rate sensor 1 is input to the first roll determination circuit 33.

The first acceleration sensor 31 detects acceleration of a direction (horizontal direction) which intersects both the travelling direction of the moving object and a gravity direction.

The first roll determination circuit 33 determines whether or not the moving object rolls, based on a roll rate which is detected by the angular rate sensor 1, a tilted angle of a roll direction which is obtained by integrating the detected roll rate, and acceleration in a horizontal direction which is detected by the first acceleration sensor 31. If determined that the moving object rolls, a first roll signal is input to the AND circuit 35.

The second acceleration sensor 32 detects acceleration of a direction (gravity direction) perpendicular to a plane on which the moving object travels.

The second roll determination circuit 34 determines whether or not the moving object rolls, based on acceleration in a horizontal direction which is detected by the first acceleration sensor 31, and acceleration in the gravity direction which is detected by the second acceleration sensor 32. If determined that the moving object rolls, the second roll determination circuit 34 inputs a second roll signal to the AND circuit 35.

If receiving both the first roll signal and the second roll signal, the AND circuit 35 outputs a roll detection signal from the roll signal output terminal 36.

The rolling detection device 3 includes the angular rate sensor 1 (1a) which can reduce an incorrect output even if excessive physical quantity is applied, and thus, it is possible to reduce the possibility of an incorrect operation such as, not outputting of the roll detection signal even if there is a roll, or outputting of the roll detection signal, even if there is no roll.

The rolling detection device 3 is described as an example of an electronic apparatus in the present embodiment, but the electronic apparatus according to the invention is not limited to this, and may be, for example, an antiskid brake device which detects rotation in a gravity direction.

Fourth Embodiment

Schematic Configuration of Moving Object

In a fourth embodiment, an automobile 4 will be described as an example of a moving object.

Figure 11:
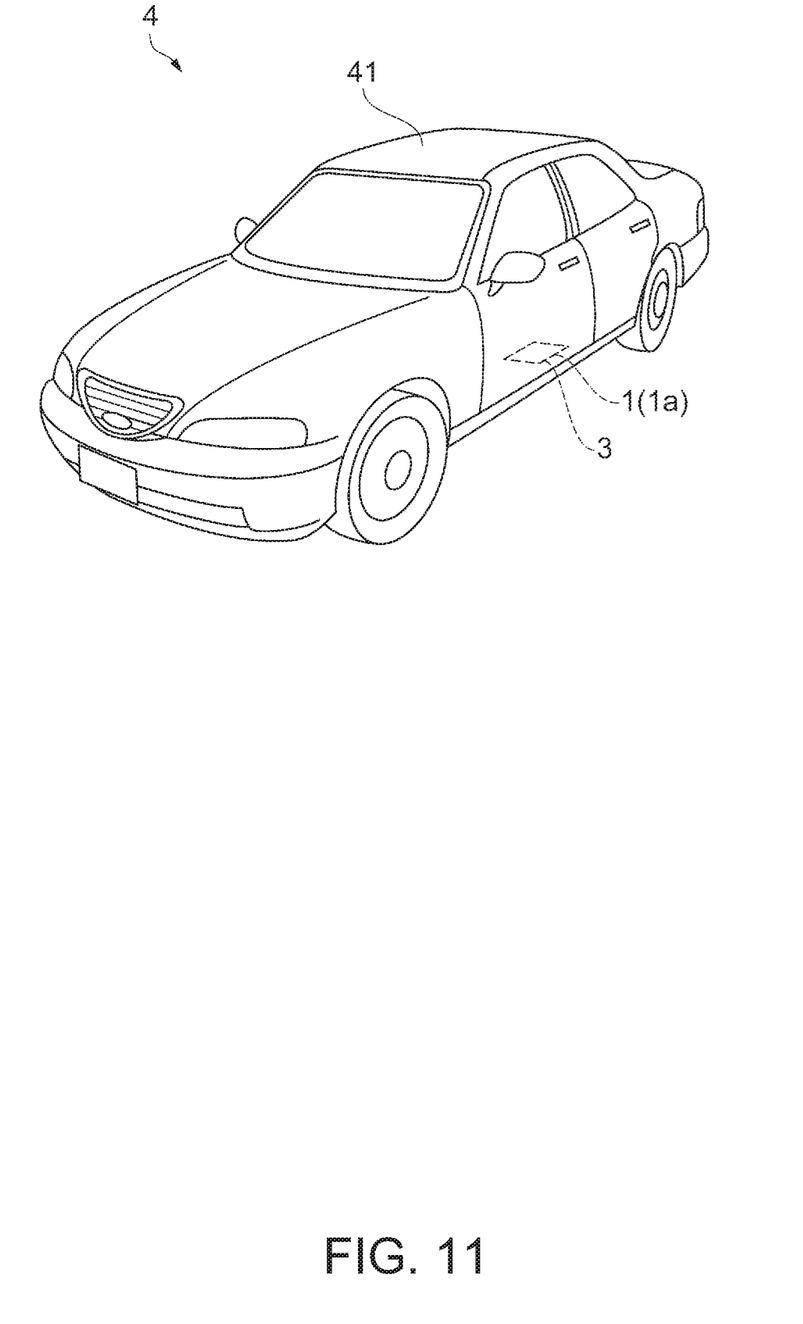
FIG. 11 is a schematic diagram of a moving object according to a fourth embodiment.

FIG. 11 is a schematic diagram of the automobile 4. The automobile 4 is configured by an automobile body 41, the rolling detection device 3, or the like. The rolling detection device 3 includes the angular rate sensor 1 (1a). The rolling detection device 3 may be provided within a passenger compartment, or may be provided within an engine room.

The automobile body 41 includes a curtain air bag which swells and sags from a roof side at the time of rolling to protect a passenger's head and neck, and a side air bag which swells from the outer portion of a seat in which a passenger sits to protect the passenger's chest and abdomen at the time of rolling.

The automobile 4 stars up the protection device, based on a roll detection signal from the rolling detection device 3. The automobile 4 includes the angular rate sensor 1 (1a) which can reduce an incorrect output even if excessive physical quantity is applied, and thus, it is possible to reduce the possibility of an incorrect operation such as, not starting of the protection device even if there is a roll, or starting of the protection device even if there is no roll.

The automobile 4 has a configuration in which a curtain air bag or a side air bag is started up based on the output of the rolling detection device 3, but the moving object according to the invention is not limited to this. For example, the moving object may have a configuration in which an output of a brake or an engine is controlled based on an output from an antis kid brake device that includes the angular rate sensor 1 (1a).

In addition, the moving object is not limited to an automobile, and may be, for example, a ship, an aircraft such as an airplane or a helicopter, a rocket, a satellite, or the like.

The entire disclosure of Japanese Patent Application No. 2015-045574, filed Mar. 9, 2015 is expressly incorporated by reference herein.

What is claimed is:

1. A physical quantity sensor comprising:
    a physical quantity detection element which outputs a physical quantity signal in accordance with physical quantity that is applied; and
    a physical quantity detection circuit which processes the physical quantity signal,
    wherein the physical quantity detection circuit includes
        a first amplifier circuit;
        a synchronous detection circuit which receives a signal from the first amplifier circuit; and
        a second amplifier circuit which receives a signal from the synchronous detection circuit, and
    wherein dynamic range of the second amplifier circuit is greater than dynamic range of the first amplifier circuit.

2. The physical quantity sensor according to claim 1, wherein the physical quantity is angular rate, and
    wherein the dynamic range of the first amplifier circuit is greater than or equal to 300°/s.

3. The physical quantity sensor according to claim 2, wherein the dynamic range of the first amplifier circuit is greater than or equal to 3000°/s.

4. The physical quantity sensor according to claim 1,
    wherein the first amplifier circuit is an AC amplifier circuit, and
    wherein the second amplifier circuit is a DC amplifier circuit.

5. The physical quantity sensor according to claim 1, further comprising:
    a first low pass filter which receives a signal from the synchronous detection circuit and outputs a signal to the second amplifier circuit; and
    a second low pass filter which receives a signal from the second amplifier circuit.

6. An electronic apparatus comprising:
    the physical quantity sensor according to claim 1.

7. A moving object comprising:
    the physical quantity sensor according to claim 1.

8. The physical quantity sensor according to claim 5, further comprising:
a third amplifier circuit which receives a signal from the second low pass filter,
wherein dynamic range of the third amplifier circuit is greater than the dynamic range of the second amplifier circuit.

9. A physical quantity sensor comprising:
a physical quantity detection element which outputs a physical quantity signal in accordance with physical quantity that is applied; and
a physical quantity detection circuit which processes the physical quantity signal,
wherein the physical quantity detection circuit includes a first amplifier circuit;
a synchronous detection circuit which receives a signal from the first amplifier circuit; and
a second amplifier circuit which receives a signal from the synchronous detection circuit, and
wherein a ratio V1/A1 between a saturation voltage V1 of the first amplifier circuit and an amplification rate A1 of the first amplifier circuit, and a ratio V2/A2 between a saturation voltage V2 of the second amplifier circuit and an amplification rate A2 of the second amplifier circuit, satisfy a relationship of V2/A2>V1/A1.

10. The physical quantity sensor according to claim 9,
wherein the physical quantity is angular rate, and
wherein dynamic range of the first amplifier circuit is greater than or equal to 300°/s.

11. The physical quantity sensor according to claim 10, wherein dynamic range of the first amplifier circuit is greater than or equal to 3000°/s.

12. The physical quantity sensor according to claim 9,
wherein the first amplifier circuit is an AC amplifier circuit, and
wherein the second amplifier circuit is a DC amplifier circuit.

13. The physical quantity sensor according to claim 9, further comprising:
a first low pass filter which receives a signal from the synchronous detection circuit and outputs a signal to the second amplifier circuit; and
a second low pass filter which receives a signal from the second amplifier circuit.

14. An electronic apparatus comprising:
the physical quantity sensor according to claim 9.

15. A moving object comprising:
the physical quantity sensor according to claim 9.

* * * * *